United States Patent [19]

Yamada

[11] Patent Number: 5,711,080
[45] Date of Patent: Jan. 27, 1998

[54] ENCODER DISC ROTATING DEVICE FOR A SURVEYING INSTRUMENT

[75] Inventor: Hideo Yamada, Tokyo, Japan

[73] Assignee: Sokkia Co., Ltd., Tokyo, Japan

[21] Appl. No.: 594,710

[22] Filed: Jan. 31, 1996

[30] Foreign Application Priority Data

Feb. 3, 1995 [JP] Japan .................................. 7-037805

[51] Int. Cl.6 .............................. G01C 1/00; G01C 15/00; G01B 11/26
[52] U.S. Cl. ...................................... 33/292; 33/290
[58] Field of Search .......................... 33/292, 281, 282, 33/285, 286, 290, 291; 292/DIG. 2

[56] References Cited

U.S. PATENT DOCUMENTS

| | | | |
|---|---|---|---|
| 1,224,725 | 5/1917 | Erickson | 33/281 |
| 1,953,804 | 4/1934 | Hayes | 33/281 |
| 4,136,955 | 1/1979 | Aeschlimann et al. | 33/281 |
| 4,752,126 | 6/1988 | Fujii | 33/285 |

FOREIGN PATENT DOCUMENTS

| | | | |
|---|---|---|---|
| 759485 | 2/1934 | France | 33/281 |
| 62-31843 | 8/1987 | Japan . | |
| 2-17356 | 5/1990 | Japan . | |
| 6241803 | 9/1994 | Japan | 33/292 |
| 1151817 | 4/1985 | U.S.S.R. | 33/292 |
| 2229822 | 10/1990 | United Kingdom | 33/290 |

*Primary Examiner*—Christopher W. Fulton
*Attorney, Agent, or Firm*—Kubovcik & Kubovcik

[57] ABSTRACT

The encoder disc rotating device for a surveying instrument comprising a vessel-shaped cover member 30 rotating coaxially with a rotating axis 22 of an encoder disc rotating knob 21 and having an opening formed at the arcuate lateral side for protruding to expose the encoder disc rotating knob 21, in which the encoder disc rotating knob 21 is protruded to expose or concealed by the rotation of the cover member 30. The cover member can ensure a large space for arranging the operation system without changing the machine height and cover the encoder disc rotating knob for preventing erroneous operation without hindering the operation.

2 Claims, 8 Drawing Sheets

ENCODER DISC ROTATING DEVICE FOR A SURVEYING INSTRUMENT

BACKGROUND OF THE INVENTION AND RELATED ART STATEMENT

The present invention concerns a encoder disc rotating device for a surveying instrument, for example, a theodolite or a total station and, more particularly, it relates to an encoder disc rotating device for rotating a horizontal encoder disc that rotates coaxially with a vertical axis of a theodolite or a total station having a vertical axis and a vertical axis tube and vertical outer axis tube.

Generally, in a coaxial axis surveying instrument, the vertical axis tube is supported directly, in the same manner as the single axis, on a tribrach, a vertical axis tube is supported to the tribrach, and the vertical axis and the horizontal encoder disc are adapted to be rotatable with each other.

Further, the instrument has a horizontal encoder disc attached to the vertical outer axis tube disposed to the outside of the vertical axis, and has a circular gear disposed coaxially with the vertical outer axis tube and near the outer circumferential end on one surface, and another gear formed at the top end of a rotating knob for meshing with the gear.

The surveying procedures are conducted by the coaxial axis surveying instrument described above as follows.

(1) While slackening the clamp knob, a first target point is substantially collimated by a sight telescope and the clamp knob is fixed.
(2) A fine motion knob is turned and the first surveying point is exactly collimated by the sight telescope.
(3) Then, the fine motion knob is turned to set into a predetermined angle and the angle at the point is read.
(4) The clamp knob is slackened and a second surveying point is substantially collimated by the sight telescope and the clamp knob is fixed.
(5) Then, the fine motion knob is turned, the second surveying point is exactly collimated by the sight telescope and the angle at the point is read (that is, the difference of the angle relative to the first surveying point is read).

Surveying operation is conducted by repeating the procedures (4) and (5) with respect to other surveying points.

During operation for the procedures (4), (5), the encoder disc rotating knob in the procedure (3) should not be moved. If the encoder disc rotating knob is moved, the encoder disc as a reference moves, making it necessary to repeat the surveying operation once again starting from (1) above.

By the way, since the encoder disc rotating knob is generally disposed to the lateral side on the casing of the surveying instrument and since it is disposed in an identical shape with the clamp knob or the fine motion knob and in the vicinity thereof, it may possibly cause misoperation, for which various kinds of countermeasures have been taken.

Figure 9:
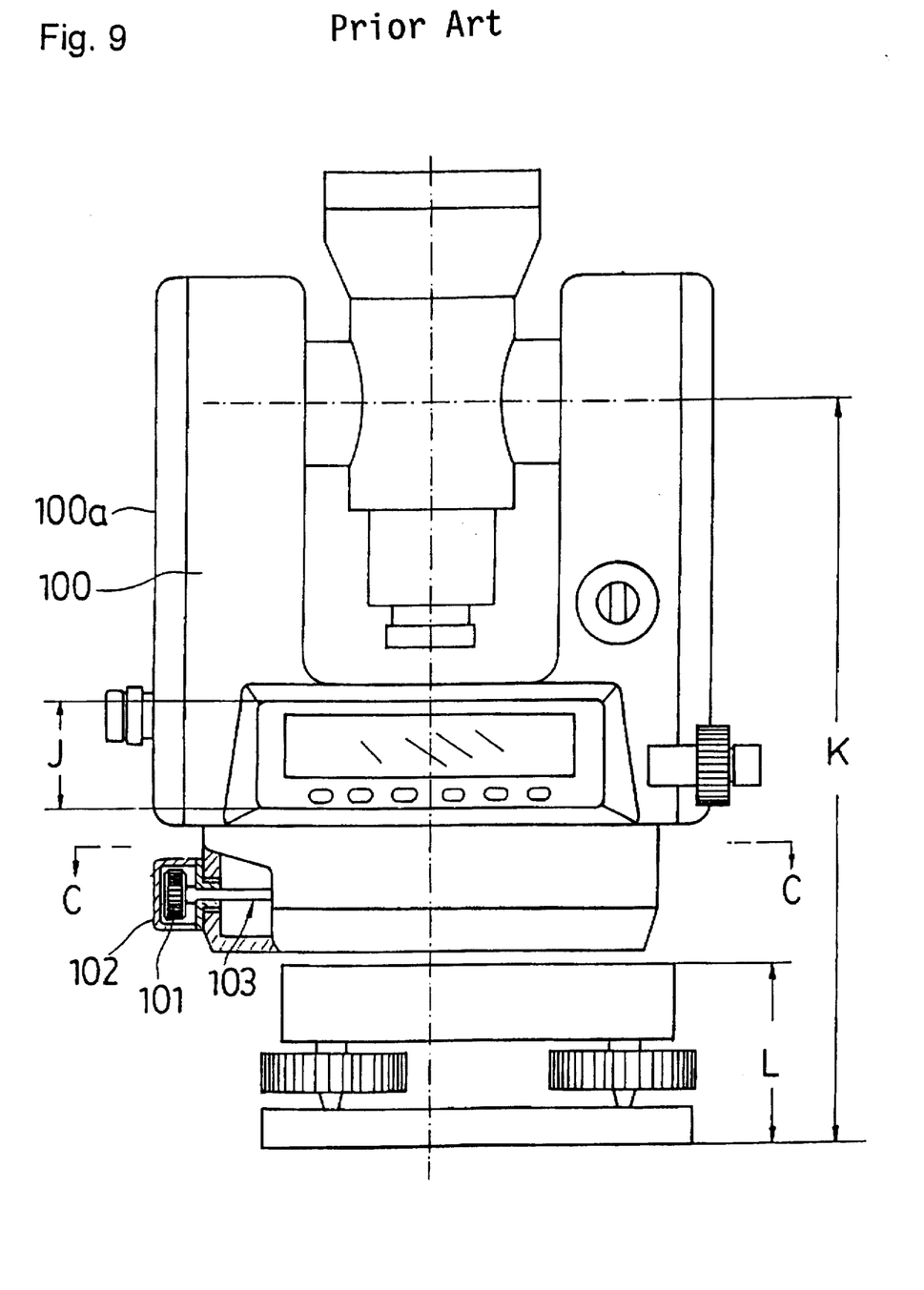
FIG. 9 is a front elevational view illustrating an embodiment of the prior art.
Figure 10:
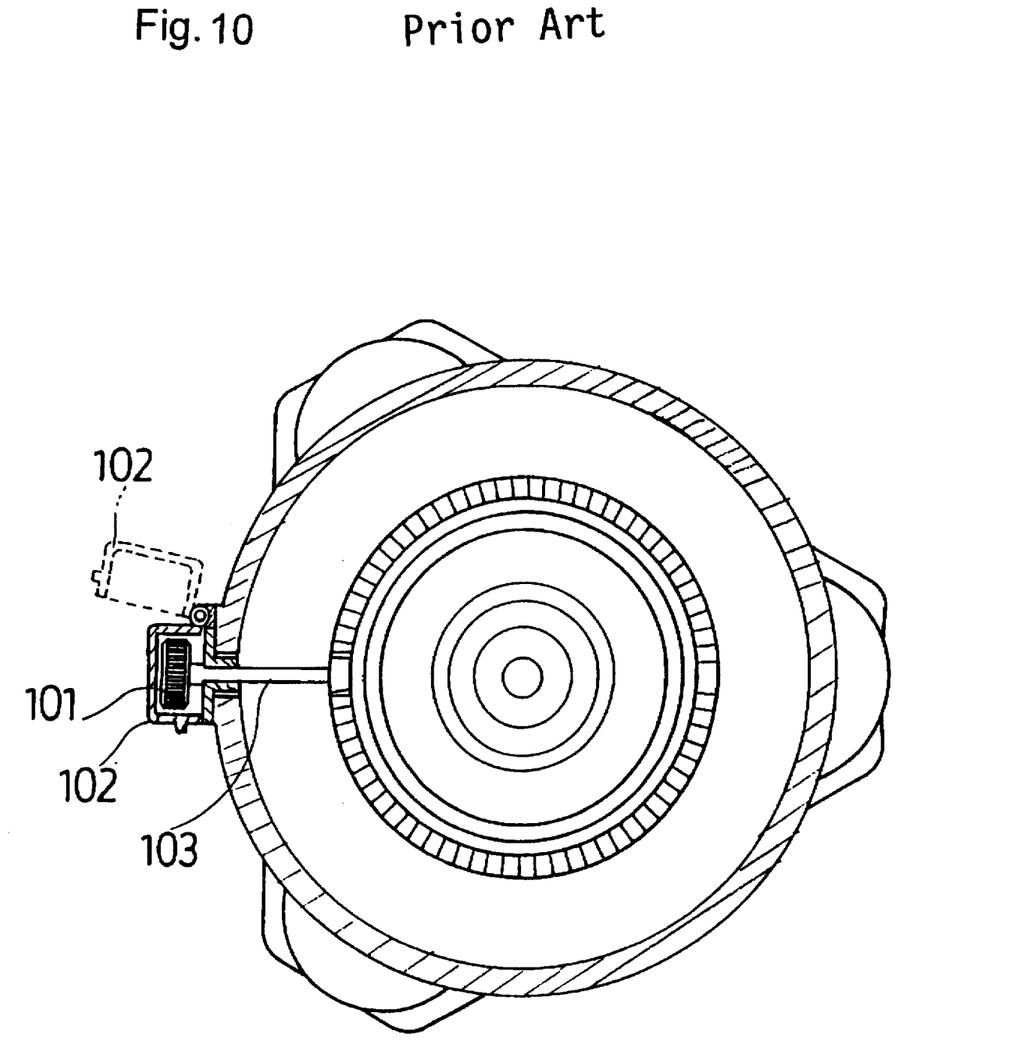
FIG. 10 is a cross sectional view taken along line C—C in FIG. 9.

For example, if the rotational knob for the encoder disc protrudes on the lateral side of a casing of a surveying instrument, it tends to cause erroneous operation and is not preferred also in view of esthetic design. Accordingly, there has been known a technique, for example, such as shown in FIG. 9 and FIG. 10. In the drawings, an encoder disc rotating knob 101 which is not used usually is not protruded out of but retracted from the arcuate lateral side 100a of a casing main body 100 of a surveying instrument and, further, a cover member 102 is provided such that the encoder disc rotating knob 101 can not be rotated usually but is rotated by opening the cover member 102 when the knob is to be operated.

OBJECT AND SUMMARY OF THE INVENTION

Recently, electronic constitutions have been adapted more and more in surveying instruments, for example, in an electronic total station, and software mounted to the surveying instrument has become complicated and progressed. In view of the above, the size of a display as a display space has been enlarged and the number of keys of a keyboard has been increased, which restricts the size for a portion J in FIG. 9 (that is, a space for disposing an operation system such as a display or a keyboard). However, in order to ensure the compatibility with existing surveying instruments, reduce the size of the surveying instruments and ensure the compatibility of prisms (targets), and for enabling the use of an existent tribrach as it is, it is not preferred to change a machine height K and it is desired to avoid change as much as possible.

Accordingly, if the encoder disc rotating knob 101 is constituted so as to protrude from the lateral side 100a of the casing main body 100 as described above without changing the height L of the tribrach and the machine height K, it leads to a disadvantage that no large space is available for the size J described above (space for disposing the operation system) in view of the arrangement of the rotational axis 103 of the encoder disc rotating knob 101.

Further, the cover member 102 proposed in the prior art as shown in FIG. 9 and FIG. 10 takes an excessive space on the side of the surveying instrument and, if the cover member 102 is kept open, it results in a disadvantage, for example, that the cover member 102 hinders operation.

An object of the present invention is to provide a encoder disc rotating device having a cover member capable of ensuring a large space for the arrangement of an operation system without changing the machine height and covering the encoder disc rotating knob for preventing erroneous operation without hindering the operation.

An encoder disc rotating device of the surveying instrument according to the present invention has a fine motion knob for finely rotating a sight telescope around a vertical axis as a center, and an encoder disc rotating knob for rotating a horizontal encoder disc around a vertical axis as a center, having a rotating axis in the direction of the vertical axis and interlocking with the rotation of the rotating axis, wherein the device comprises a vessel-shaped cover member adapted to be rotated coaxially with the rotating axis of the encoder disc rotating knob and having an opening formed to the side for protruding to expose the encoder disc rotating knob, in which the encoder disc rotating knob is protruded to be exposed or retracted to be concealed by the rotation of the cover member.

The cover member comprises an upper surface 31 having an engaging portion with the rotating axis, an arcuate lateral surface contiguous with the upper surface and bent at an angle of about 90 degree and a finger formed by protrusion from the lateral surface.

In accordance with the present invention, when the encoder disc rotating knob is manipulated, the encoder disc rotating knob is rotated coaxially by the rotation of the cover member, thereby enabling to protruding to expose the encoder disc rotating knob and conduct rotating operation for the encoder disc rotating knob.

In addition, since the cover member rotates coaxially with the rotational shaft of the encoder disc rotating knob, when the cover member is rotated thereby protruding to expose the encoder disc rotating knob from the opening, the lateral side is covered so far as the encoder disc rotating knob is moved to a position opposite to the opening. That is, when the encoder disc rotating knob is protrudes to be exposed from the opening of the cover member, it is moved to and concealed by the surveying instrument main body and the cover member is in a contained state. Accordingly, since the cover member protects the fine motion knob when it is closed and the cover member is contained in the base portion upon operating the encoder disc rotating knob, it does not hinder the operation. Then, a large space can be ensured for arranging the operation system without changing the machine height.

DETAILED DESCRIPTION OF THE PREFERRED EMBODIMENT

The present invention is described by way of a preferred embodiment with reference to the drawings. Components and arrangement thereof to be described hereinafter do not restrict the present invention but can be modified variously within the scope of the present invention.

Figure 1:
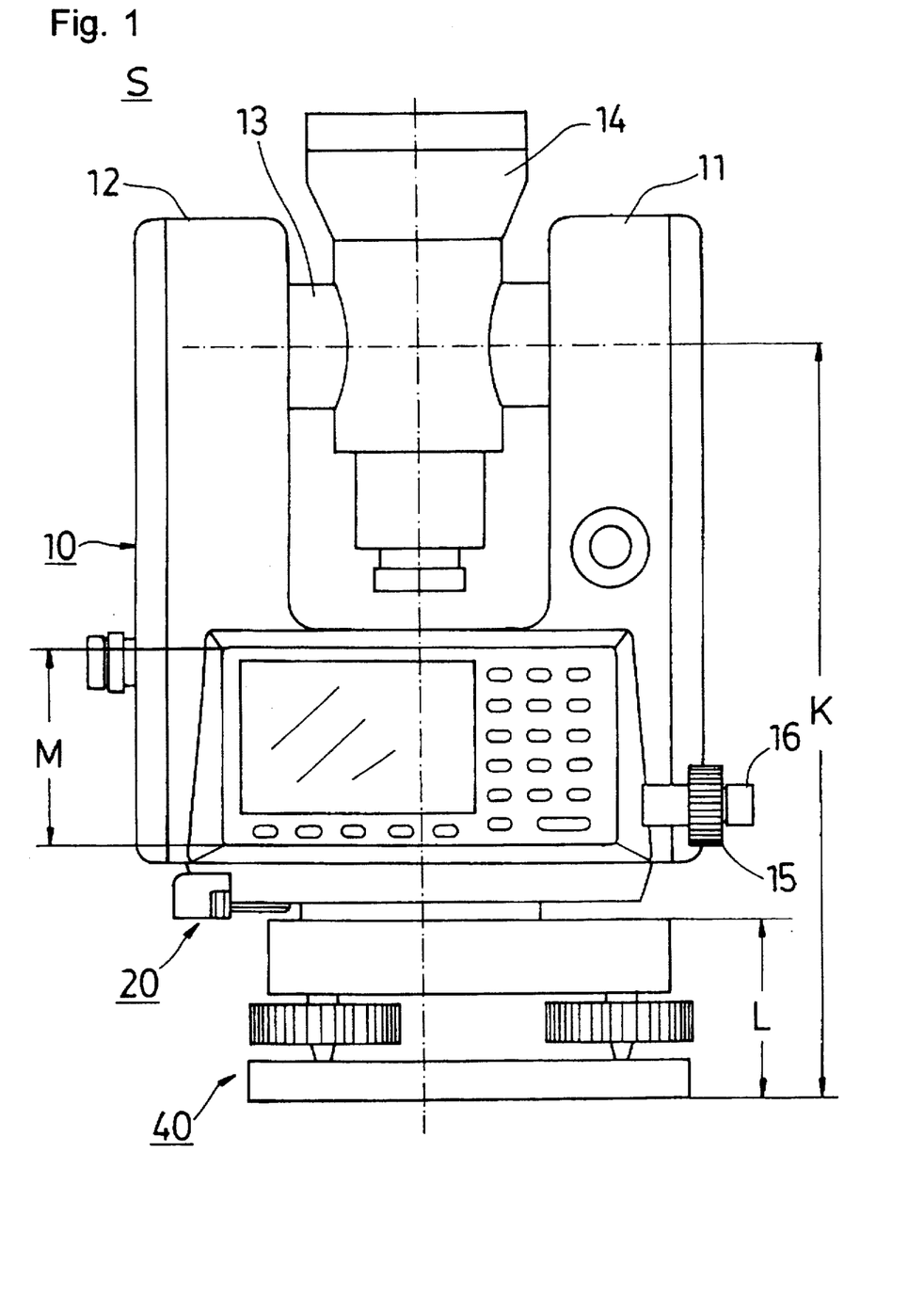
FIG. 1 is a front elevational view of a total station.
Figure 2:
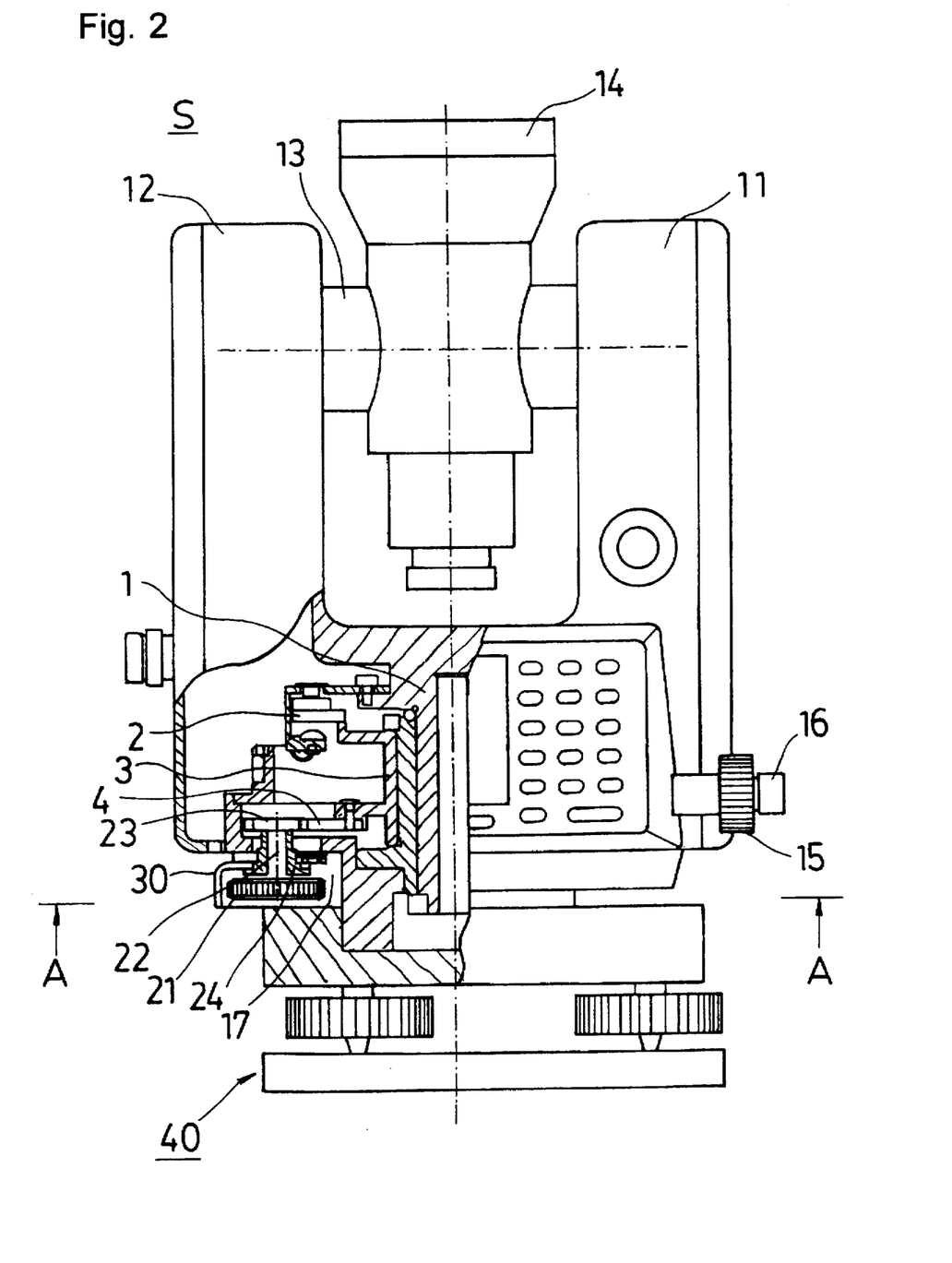
FIG. 2 is an explanatory cross sectional view for a main portion of FIG. 1.
Figure 3:
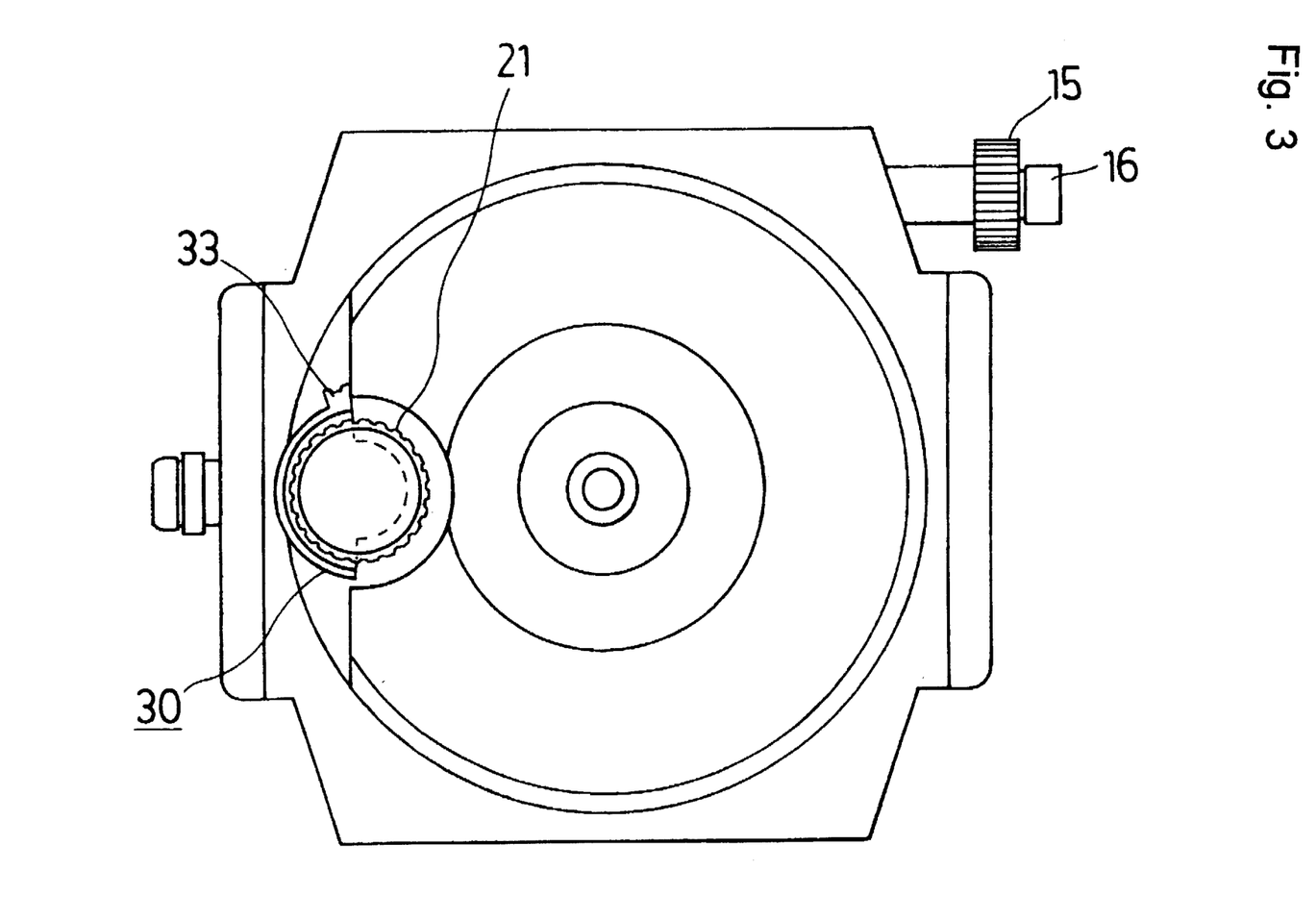
FIG. 3 is a cross sectional view taken along line A—A in FIG. 2 illustrating a state of closing a cover member.
Figure 4:
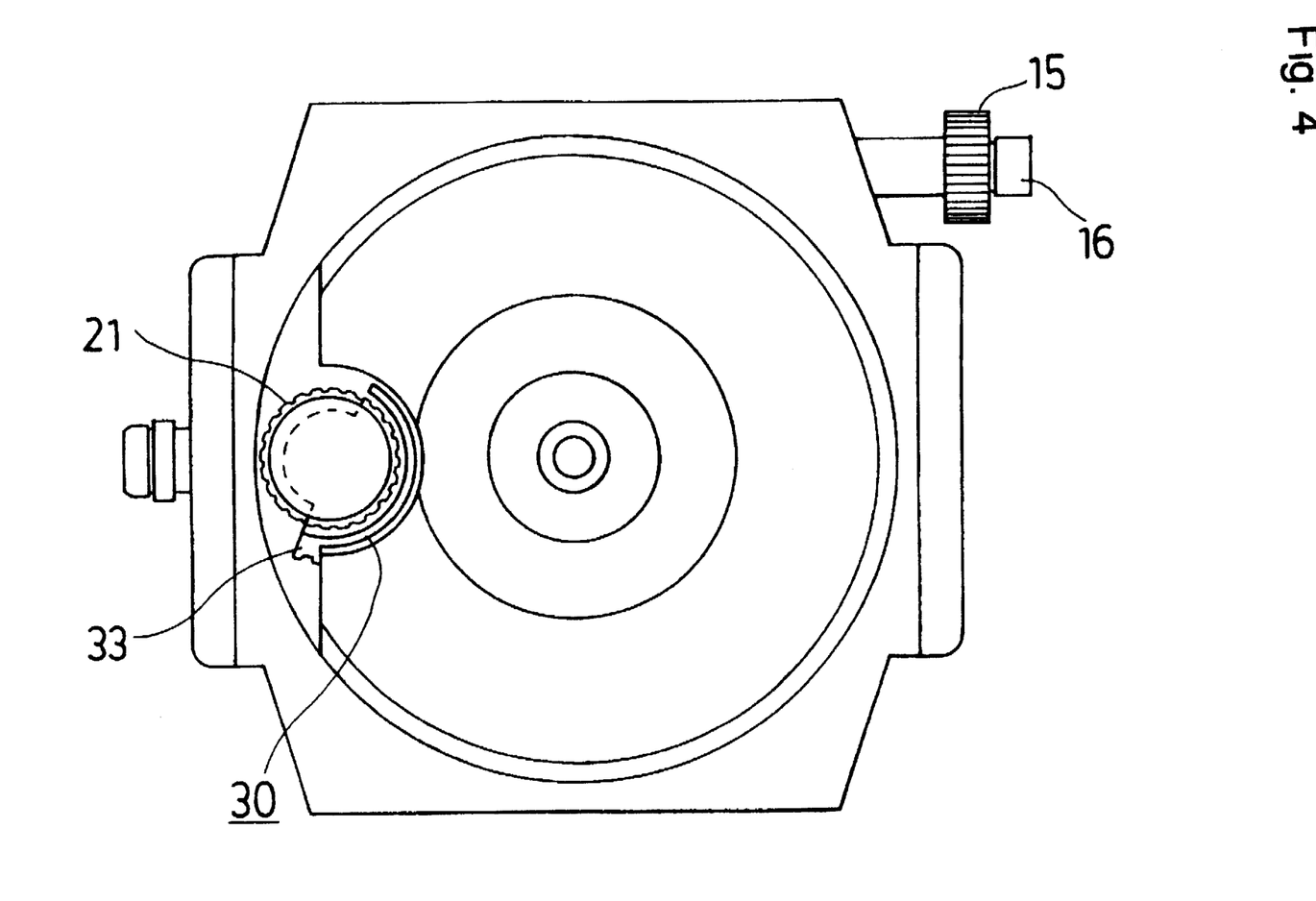
FIG. 4 is a cross sectional view taken along line A—A in FIG. 2 illustrating the state of opening a cover member.
Figure 5:
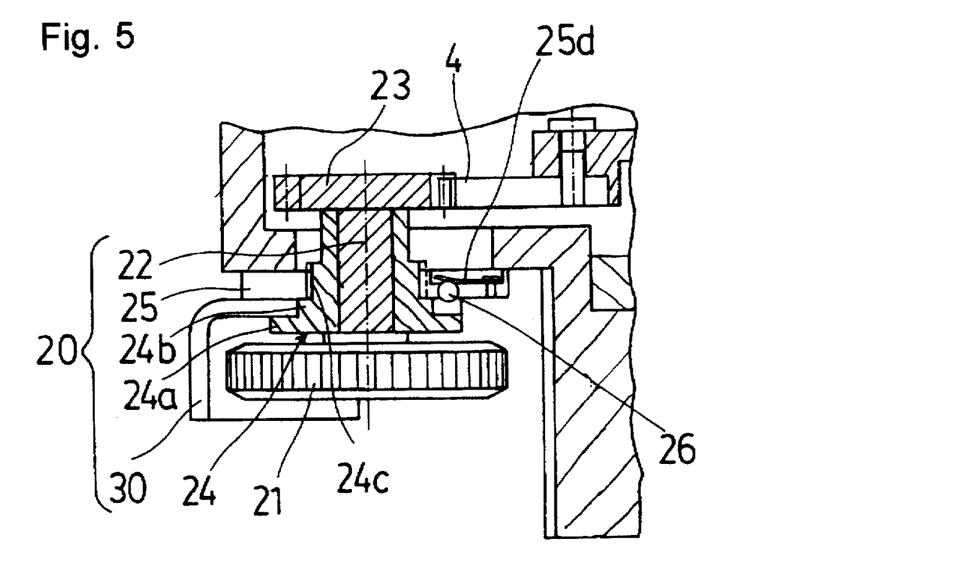
FIG. 5 is an explanatory cross sectional view for a main portion of FIG. 2.
Figure 6:
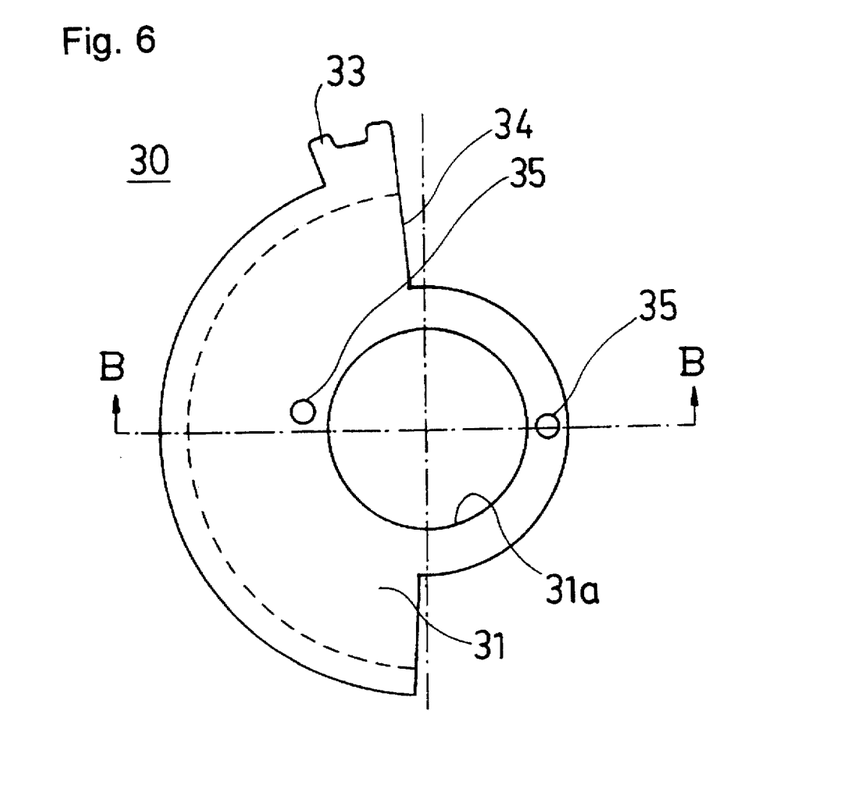
FIG. 6 is a plan view for the cover member.
Figure 7:
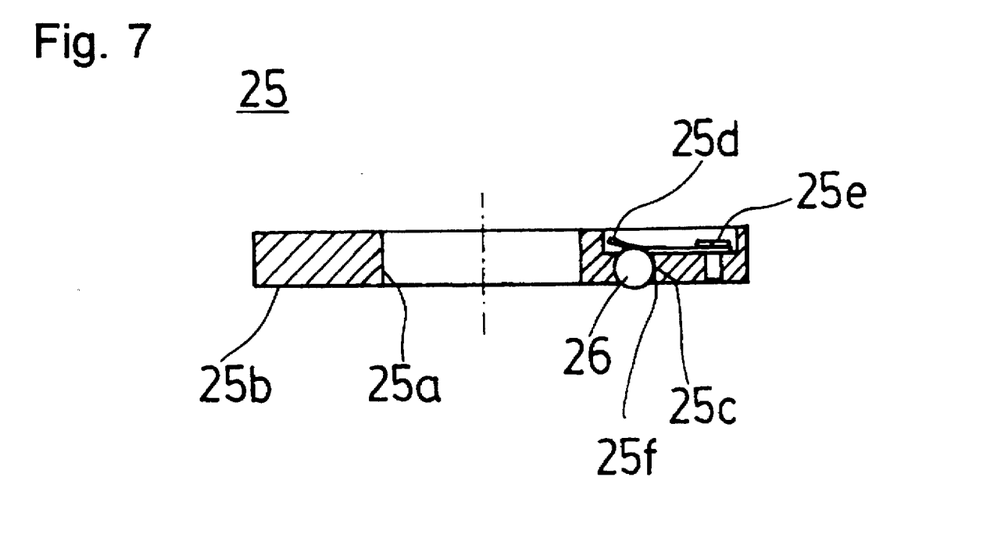
FIG. 7 is a cross sectional view of a knob mounting plate.
Figure 8:
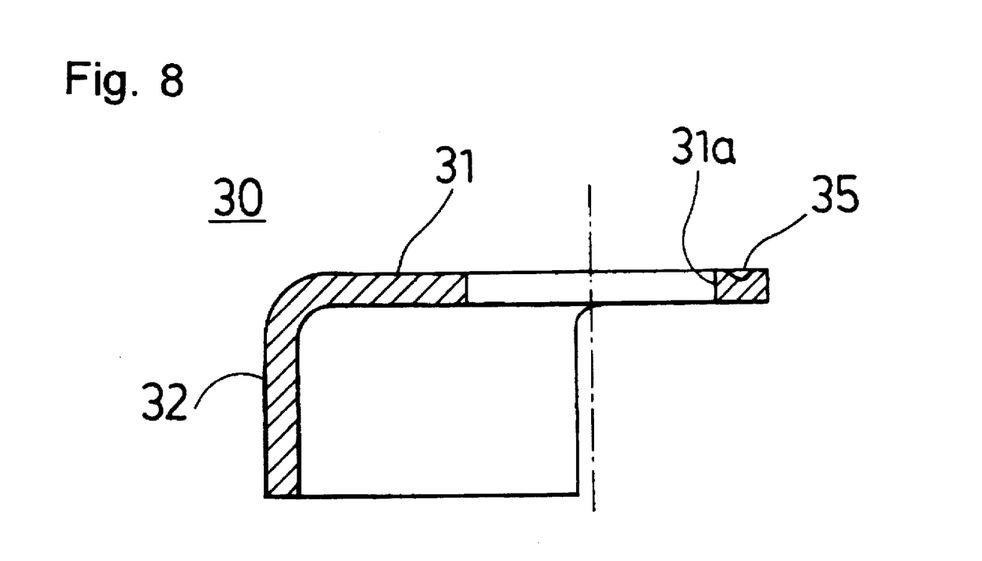
FIG. 8 is a cross sectional view taken along line B—B in FIG. 6 illustrating the cover member.

FIG. 1 to FIG. 8 show a preferred embodiment of a encoder disc rotating device for a surveying instrument according to the present invention, in which FIG. 1 is a front elevational view of a total station as a surveying instrument, FIG. 2 is an explanatory cross sectional view for a main portion of FIG. 1, FIG. 3 is a cross sectional view taken along line A—A in FIG. 2 illustrating a state of closing the cover member, FIG. 4 is a cross sectional view taken along line A—A in FIG. 2 illustrating a state of opening the cover member, FIG. 5 is an enlarged cross sectional view for a main portion in FIG. 2, FIG. 6 is a plan view of the cover member, FIG. 7 is a cross sectional view of a knob mounting plate and FIG. 8 is a cross-sectional view taken along line B—B in FIG. 6 and illustrating the cover member.

Generally, a surveying instrument (total station in this embodiment) S is used disposed on a tribrach 40 as shown in FIG. 1. The total station S in this embodiment comprises a casing main body 10 having two standards 11, 12, a horizontal axis 13 disposed between the standards 11, 12 and a sight telescope 14 disposed rotatably around the horizontal axis 13. A large space M for disposing an operation system is taken in a lower portion of the casing main body 10 and a fine motion knob 15 and a clamp knob 16 are disposed on one side thereof.

A encoder disc rotating device 20 in this embodiment comprises, as main components, a recess 17 for arranging the encoder disc rotating device 20 formed to the casing main body 10, a encoder disc rotating knob 21 and a cover member 30. The recess 17 for arranging the encoder disc rotating device 20 is formed on the lower side of the casing main body 10 opposite the tribrach 40 (refer to FIGS. 1 and 2) and is formed as a cylindrical recess having an arcuate angle of 180° or greater.

The encoder disc rotating knob 21 in this embodiment is disposed in the recess 17 and it is disposed in parallel with a vertical axial line, that is, a vertical axis 1. That is, a vertical outer axis tube 3 attached with a horizontal encoder disc 2 is disposed to the outer circumference of the vertical axis 1 and a large spur gear 4 is attached coaxially with the horizontal encoder disc 2. Then, a small spur gear 23 is formed at the top end of a rotating axis 22 of the encoder disc rotating knob 21 disposed in parallel with the vertical axial line, that is, with the vertical axis 1, and the small spur gear 23 formed at the top end of the rotating axis 22 of the encoder disc rotating knob 21 is engaged with the large spur gear 4.

A metal member 24 is disposed to the outer circumference of the rotating axis 22 of the encoder disc rotating knob 21. The metal member 24 in this embodiment comprises a hollow cylindrical member having a multi-stepped outer circumference. That is, at the outer circumference of the metal member 24, a support portion 24a extends toward the encoder disc rotating knob 21, and a knob mounting plate disposing portion 24c is formed by way of a disposing portion 24b for the cover member 30 retracted toward the center from the support portion 24a and further retracted to the center.

FIG. 7 is a cross sectional view of a knob mounting plate 25 comprising a circular plate. An engaging hole 25a is formed at a central portion for fitting the knob mounting plate disposing portion 24c of the metal member, a retaining portion 25b for retaining the cover member 30 to be described later is formed to the outer circumference of the engaging hole 25a and a disposing portion 25c for a ball (steel ball) 26, a leaf spring 25d and a leaf spring retainer 25e are provided to a portion of the retaining portion.

The disposing portion 25c for the ball 26 has a through-hole defined with an opening 25f smaller than the ball diameter formed at arculate the lower side (FIG. 7), in which a ball 26 is disposed and the upper surface of the ball 26 is retained by the leaf spring 25d which is retained by the leaf spring retainer 25e such as a machine screw at one end and which always biases the ball 26 from the upper surface so as to be always expose the ball to the opening 25f.

As shown in FIGS. 6 and 8, the cover member 30 in this embodiment comprises an upper surface 31 having an engaging portion 31a with a rotating axis (metal member 24 in this embodiment), an arcuate lateral side 32 in contiguous with the upper surface 31 and bent at an angle of about 90 degree and a finger 33 protruded from the arcuate lateral side 32. The finger 33 in this embodiment is formed in contiguous with the upper surface 31 and to the outside of the arcuate lateral side 32 and the cover member 30 is rotated by catching and rotating the finger 33.

The engaging portion 31a of the upper surface 31 with the rotating axis is rotatably disposed to the outer diameter of the disposing portion 24b on the support portion 24a of the metal member 24 described above. In this embodiment, the upper surface 31 of the cover member 30 is shaped such that a portion for about 180 degree is cut away while leaving the width of the support portion 24a. Then, the arcuate lateral side 32 in contiguous with the upper surface 31 is also cut away similarly, and the recessed portions of the upper surface 31 and the arcurate lateral side 32 constitute an opening 34.

Further, at two positions of the upper surface 31, that is, at the positions corresponding to the positions for the ball 26 of the knob mounting plate 25 when the cover member 30 is rotated to fully open the opening portion 34 or when the cover member 30 is closed to conceal the encoder disc rotating knob 21 as shown in FIGS. 5, 6 and 8, so as to allow the ball 26, which is energized by the leaf spring 25d, to enter the recess 35, thereby giving a feeling of clicking upon opening and closing the cover member 30 and keeping each of the states.

As has been described above, the cover member 30 is arranged rotatably between the metal member 24 and the knob mounting plate 25 around the encoder disc rotating knob 21. Upon manipulating the encoder disc rotating knob 21, the cover member 30 is rotated coaxially around the encoder disc rotating knob 21 by catching and rotating the finger 33, to expose the encoder disc rotating knob 21, by which rotating operation of the encoder disc rotating knob 21 is enabled.

Since the cover member 30 is rotated in the same direction as the encoder disc rotating knob 21, when the cover member 30 is rotated to expose the encoder disc rotating knob 21 from the opening portion 34, the arcuate lateral side 32 covering the encoder disc rotating knob 21 so far is moved to the position opposite to the opening portion 34. That is, when the encoder disc rotating knob 21 is exposed from the opening portion 34 of the cover member 30, the cover member 30 is moved to and concealed by the casing main body 10, and put to a state as if it were contained. This position can be kept while providing a feeling of clicking by the recess 35 of the cover member 30 and the ball 26 of the knob mounting plate 25. Further, if the ball 26 of the knob mounting plate 25 tends to rotate over the recess 35 of the cover member 30, the finger 33 then abuts against the entrance at the recess 17 of the casing main body 10 of the surveying instrument to thereby inhibit further rotation.

Upon concealing the encoder disc rotating knob 21, the rotating direction by the finger 33 is reversed. Further, since it is not required to dispose the encoder disc rotating knob 21 being retracted from the arcuate lateral side of the casing and it is not necessary to dispose the rotating axis 22 of the encoder disc rotating knob 21 from the side of the casing as in the prior art, a large space for arranging the operation system can be ensured without changing the instrument height.

We claimed:

1. A graduated circle rotating device for a surveying instrument having a fine motion knob for finely rotating a sight telescope around a vertical axis as a center, and an encoder disc rotating knob having a rotating axis in the direction of a vertical axis line and which rotates a horizontal encoder disc around a vertical axis as a center, and, wherein the device is provided with a vessel-shaped cover member which rotates coaxially with the rotating shaft of said encoder disc rotating knob and has an opening formed on the lateral side for exposing said encoder disc rotating knob, and wherein said encoder disc rotating knob is exposed or concealed by rotating said cover member.

2. The encoder disc rotating device of a surveying instrument as defined in claim 1, wherein the cover member comprises an upper surface having an engaging portion with the rotating axis, an arcuate lateral surface in contiguous with said upper surface and bent at an angle of about 90 degree and a finger formed by being protruded from said arcuate lateral side.

* * * * *